United States Patent Office 3,213,139
Patented Oct. 19, 1965

3,213,139
METHOD FOR THE PREPARATION OF 2-AMINOBENZOPHENONES
George Chase, Hawthorne, Lee Allen Dolan, Verona, and David Wagner, Clifton, N.J., assignors to Hoffmann-La Roche Inc., Nutley, N.J., a corporation of New Jersey
No Drawing. Filed Sept. 11, 1961, Ser. No. 137,046
5 Claims. (Cl. 260—570)

This invention relates to a process for the preparation of 2-aminobenzophenones unsubstituted in the 5-position. 2-aminobenzophenones unsubstituted in the 5-position are valuable chemical intermediates useful in the preparation of medicinally valuable compounds. For example, they can be reacted with glycine ethyl ester hydrochloride to form 7 - unsubstituted - 5 - phenyl-3H-1,4-benzodiazepin-2 (1H)-ones, which are medicinally valuable, and which can in turn be nitrated to form corresponding 7-nitro compounds, which are also medicinally valuable compounds. As an intermediate in a different process, 2-aminobenzophenones can be converted to their oximes with hydroxylamine, and said oximes can be converted to 2-chloromethyl-4-phenyl quinazoline 3-oxides, and the latter compounds can then be converted into 2-methylamino-5-phenyl-3H-1,4-benzodiazepine 4-oxides, which are medicinally valuable compounds. The latter preparation is illustrated in U.S. Patent 2,893,992.

The purpose of this invention is to provide a process for the preparation of 5-unsubstituted-2-aminobenzophenones which render said compounds readily obtainable from available intermediates. More particularly the invention relates to a process which comprises the selective dehalogenation of a 5-halo-2-aminobenzophenone. Thus the invention relates to a process for the preparation of 2-aminobenzophenones unsubstituted in the 5-position, which comprises hydrogenating a 5-halo-2-aminobenzophenone with gaseous hydrogen in the presence of palladium catalyst, a halide ion acceptor, and an organic solvent.

The process of the invention can be executed by a variety of manipulative procedures, for example, gaseous hydrogen can be introduced to a mixture of the compound to be dehalogenated and an organic solvent in which the palladium catalyst is suspended. Atmospheric pressure can be used and the reaction media can be subjected to slight agitation. Alternatively a solution of the compound can be agitated with a palladium catalyst and hydrogen at a superatmospheric pressure. The working examples herein below describe in more detail these and other manipulative procedures, and still other manipulative procedures will be readily apparent to those skilled in the art and are included within the scope of the invention.

As indicated above, selective dehalogenation of the invention is effected by the use of palladium catalyst. The palladium catalyst can be used either in a colloidal or an amorphous form, but a preferred embodiment of the invention comprehends the use of a palladium catalyst in an amorphous form. Supported palladium catalysts can be used. For example, a palladium catalyst can be charged into the reaction vessel in the form of palladium on calcium carbonate, palladium on carbon, or the like. Another embodiment of the invention comprehends an in situ formation of the palladium catalyst. This can be effected in a variety of ways. For example, the carrier to be used, such as carbon, can be suspended in the organic solvent to be used, and a palladous salt, such as palladous chloride or the like, can then be added to said suspension.

As stated above the process of the invention can be effected at atmospheric pressure or superatmospheric pressure. High pressures have been found operative but for purposes of convenience, pressures slightly above atmospheric, for example, less than about ½ p.s.i.g., are preferred. The organic solvent in which the reaction of the invention can be effected can be a conventional organic solvent such as a lower alkanol, for example, ethanol; tetrahydrofuran; dioxane; or the like. Water can be added thereto in order to facilitate the dissolution of the reactants. The process can be effected at room temperatures or higher temperatures up to the boiling point of the particular solvent being used. It has been found, however, that lower temperatures tend to encourage better yields. It is thus preferred to effect the dehalogenation at a temperature below about 30° C.

The halide ion acceptor can be any basic material compatible with the reaction media and other reactants. Conveniently it can be a hydroxide of an alkali metal or of an alkaline earth metal, such as potassium hydroxide, sodium hydroxide, or the like; an alkali metal or an alkaline earth metal salt of an organic carboxylic acid, such as a salt of a lower alkanoic acid, such as sodium acetate, potassium acetate or the like; or ammonium hydroxide. The form in which the halide ion acceptor, i.e. the basic substance, is used is not critical. It can be added to the reaction media in the form of a powder, as pellets, in solution, such as in an aqueous or an alcoholic solution, or in any other convenient form.

The concentration of the reactants is not critical. The 5-halo-2-aminobenzophenone to be dehalogenated conveniently can be present in the reaction media in a concentration of from about 10 percent to about 20 percent. However, lower and higher concentrations can be used. Similarly, the amount of halide ion acceptor, i.e. base, used should be the stoichiometric amount, but an excess can be used. The quantity of hydrogen necessary will vary with the efficiency of the particular piece of equipment being used, but will always be at least the stoichiometric amount.

The process of the invention selectively dehalogenates a 5-halo-2-aminobenzophenone. Thus, for example, 2-aminobenzophenone can be prepared by hydrogenating 5-halo-2-aminobenzophenone with gaseous hydrogen in the presence of a palladium catalyst, a halide ion acceptor and an organic solvent. Similarly a 2'-substituted-2-aminobenzophenone, such as a 2'-halo-2-aminobenzophenone, can be prepared by hydrogenating a 5-halo-2'-substituted-2-aminobenzophenone, such as a 5,2'-dihalo-2-aminobenzophenone, with gaseous hydrogen in the presence of palladium catalyst, a halide ion acceptor and an organic solvent. Similarly other 2-aminobenzophenones unsubstituted in the 5-position, such as 3-lower alkyl-2-aminobenzophenones, can be prepared by the process of the invention.

The terms halo and halogen as used in this disclosure include all four halogens, i.e. iodine, chlorine, bromine and fluorine. Especially preferred as starting materials are those 5-halo-2-aminobenzophenones wherein the 5-halo substituent is chlorine or bromine. The term lower alkyl includes both straight and branched chain carbon-hydrogen groups, such as methyl, ethyl, propyl, isopropyl, and the like.

The following examples are illustrative but not limitative of the invention. Variations on the manipulative procedures, apparatus and conditions used will be readily apparent to those skilled in the art, and are within the scope of the invention. All temperatures are stated in degrees centigrade.

Example 1

115.7 g. of 5-chloro-2-aminobenzophenone, 28.0 g. of powdered potassium hydroxide, 12 g. of 10 percent palladium on calcium carbonate and sufficient ethanol to bring the total volume to 1200 cc. were charged into the glass liner of a rocking autoclave which was then pressurized with hydrogen gas to 1000 p.s.i.g. Agitation was started and over a period of 40 minutes the temperature raised to about 70°. The calculated amount of hydrogen pressure drop was 64 p.s.i.g. In this experiment 70 p.s.i.g. were absorbed.

Upon cooling the autoclave was opened and the catalyst was removed by filtration. The filtrate was then vacuum concentrated to about ½ its volume and about an equal amount of water was then added. Yellow crystals of 2-aminobenzophenone began to form and the mixture was refrigerated overnight. The following day the crystals were isolated and air dried.

*Example 2*

115.75 g. of 5-chloro-2-aminobenzophenone, 49 g. of potassium acetate, 12 g. of 10 percent palladium on charcoal and sufficient ethanol to bring the volume to 3.25 liters were charged into a low pressure stirred autoclave. The temperature was held between 39° and 41° by means of a water bath and stirring started. Hydrogen uptake (calculated as theoretically 0.456 ft.$^3$) was over in 2¼ hours. Stirring was stopped to prevent overhydrogenation and the mixture blown out of the apparatus. The catalyst was removed by filtration and the solution was subjected to vacuum distillation.

When the volume reached about ½ its original amount an equal quantity of water was added. The turbid solution was refrigerated overnight and the yellow crystals of 2-aminobenzophenone isolated by filtration the next day. On standing a second crop of crystals slowly precipitated from the solution.

*Example 3–11*

By the procedures set forth in Examples 1 and 2 above the following experimental runs were conducted using 5-chloro-2-aminobenzophenone as a starting material. In each instance the experimental was successful and 2-aminobenzophenone was obtained in good yield. The reference in the table to water used indicates that in those experimental runs small amounts of water were used to lessen the length of time required to bring the base into solution.

gauge. With the conditions described above the hydrogenation was complete and static at the latter pressure in 1.5 hours. The autoclave was vented to the atmosphere, flushed with nitrogen, and the catalyst in the vessel then removed by filtration. The clear light yellow filtrate was sharply acidic with acetic acid. It was evaporated to dryness in vacuo at 50°. The crystalline residue containing crude 2-aminobenzophenone was triturated with tap water to dissolve the salts, filtered and dried. The crude product was crystallized from ethanol.

*Example 13*

2.5 g. of charcoal was suspended in 100 ml. of tetrahydrofuran in the pressure vessel described in Example 12. To this was added 2.5 ml. of 5 percent palladous chloride solution, 15.0 g. of powder potassium acetate-N.F. and 26.6 g. of 2-amino-2'-chloro-5-chlorobenzophenone. The hydrogenation was carried out as described in Example 12 and was complete in 2 hours. The product was worked up as described in example 12 yielding a syrupy yellow oil, from which the dehalogenated compound, 2-amino-2'-chlorobenzophenone, was isolated in the form of its bromoacetyl derivative.

*Example 14*

5.0 g. of charcoal was suspended in 100 ml. of tetrahydrofuran in the pressure vessel described in Example 12. 5.0 ml. of 5 percent palladous chloride solution was then added thereto with gentle agitation. Next 15.0 g. of powdered potassium acetate was added followed by 24.6 g. of 2-amino-3-methyl-5-chlorobenzophenone. The vessel was placed in the shaker and pressurized as described in Example 12. When equilibrium conditions were established, the agitation was started. The absorption of 0.1 mole of hydrogen was complete in 5–6 hours. The excess hydrogen was vented to the atmosphere, the bottle flushed with nitrogen and the catalyst removed by filtration. The yellow filtrate and catalyst wash of tetrahydrofuran were combined and evaporated to a syrup in vacuo. The syrup was disolved in methylene chloride and the solution washed with 3 N hydrochloric acid. The sol-

| Ex. | Catalyst | Base | Water Used | Autoclave Type and Capacity | Observation Pressure Drop, p.s.i. | Theoretical Pressure Drop, p.s.i. | Initial Pressure of H$_2$, p.s.i.g. | Remarks |
|---|---|---|---|---|---|---|---|---|
| 3 | Pd/CaCO$_3$ | KOH | No | 1,200 cc. Rocker | 66 | 64 | 1,000 | |
| 4 | Pd/CaCO$_3$ | KOH | No | ----do---- | 55 | 64 | 1,000 | |
| 5 | Pd/C | NaAc | No | ----do---- | 65 | 64 | 1,000 | |
| 6 | Pd/C | KAc | No | ----do---- | 64 | 64 | 1,000 | |
| 7 | Pd/C | KAc | Yes | 5 gal. Stirrer | 78 | 78 | 450 | Catalyst added last. |
| 8 | Pd/CaCO$_3$ | KAc | No | 600 cc. Rocker | 61 | 53 | 1,000 | |
| 9 | Pd/CaCO$_3$ | KAc | No | 1,200 cc. Rocker | 55 | 64 | 1,000 | Do. |
| 10 | Pd/C | KAc | No | Low Pressure Stirrer | 0.456 ft.$^3$ | 0.456 ft.$^3$ | ½ | |
| 11 | Pd/CaCO$_3$ | NH$_4$OH | Yes | 1,200 cc. Rocker | 64 | 72 | 1,000 | |

*Example 12*

5.0 g. of charcoal was suspended in 100 ml. of tetrahydrofuran contained in the pressure bottle of a low pressure laboratory hydrogenator. The hydrogenator had no facilities for heating or cooling and was equipped with a recording pressure gauge, range 0–50 lbs., and a complete chart rotation in one hour. 5.0 ml. of 5 percent palladous chloride was added with gentle swirling to the suspension in the bottle. Next 15.0 g. of powdered potassium acetate-N.F. and 23.1 g. of 2-amino-5-chlorobenzophenone were added. The bottle was placed in autoclave and pressurized twice to 30 lbs. gauge with hydrogen, each time being vented to the atmosphere. The vessel was then again filled with hydrogen to 30 lbs. gauge and permitted to come to equilibrium during a period of 30 minutes. Agitation was then started and after a short induction period, the hydrogenation proceeded as indicated by a smooth drop in pressure. The hydrogenator had been previously calibrated against pure ethyl p-nitrobenzoate. For 0.1 mole of this material, pressure drop was 15 lbs.

vent layer was dried and evaporated in vacuo to an oil. Trituration with hot petroleum solvent (Skellysolve B) caused the oil to crystallize. The crude 2-amino-3-methylbenzophenone so obtained was recrystallized from petroleum solvent (Skellysolve A).

*Example 15*

3 kg. of charcoal was suspended in 120 liters of tetrahydrofuran in a vertical stainless steel autoclave. To the stirred suspension were added 18 kg. of anhydrous powdered potassium acetate-N.F. Next 375 ml. of 20 percent palladous chloride solution was slowly added. The suspension was then stirred for 10 minutes following which 27.78 kg. of 2-amino-5-chlorobenzophenone was added. The agitation was then interrupted and the autoclave closed. The autoclave was then vented to the atmosphere, flushed with nitrogen, and then pressurized to 30 p.s.i.g. with hydrogen.

The agitation was resumed and the hydrogenation carried out keeping the temperature below 30° with cooling water in the jacket. The catalyst was removed by filtration. The autoclave and the carbon catalyst were washed with an additional 20 liters of tetrahydrofuran and the filtrate and wash were then combined in a still. The tetrahydrofuran was removed under vacuum at 90° until no further distillate was obtained. The oily residue was twice triturated, each time with 20 liters of hot water, to remove the potassium chloride and excess potassium acetate present. Care was taken to remove as much water as possible without actually removing the batch from the still. The residue was taken up in 24 liters of boiling ethanol. Cooling water was then applied to the jacket of the still and the batch was diluted with 24 liters of petroleum solvent (Skellysolve B). The product which crystallized was cooled with stirring (water) overnight. The next day the crude 2-aminobenzophenone so obtained was filtered and twice washed with 5 liters of petroleum solvent (Skellysolve B) and then dried at vacuo overnight at 50°.

*Example 16*

Into a stirred, stainless steel, low pressure hydrogenation vessel of 14 liters capacity, operating at less than ½ p.s.i.g. hydrogen pressure were placed in the following order: 5 g. of charcoal, 1.75 liters of tetrahydrofuran, 2.5 cc. of 20 percent palladous chloride, 7.85 g. of potassium acetate and 22 g. of 5-bromo-2-aminobenzophenone. The calculated consumption of hydrogen was 0.0696 ft.$^3$ and after 4½ hours stirring at room temperature (29°) 0.038 ft.$^3$ of hydrogen was absorbed. At this point the apparatus was opened and a fresh charge of 2.5 cc. of 20 per cent palladous chloride added. Stirring was continued for another 1½ hours but no further hydrogen up take was observed.

The catalyst was removed by filtration and the filtrate concentrated in vacuum to ½ volume and placed in the refrigerator overnight. No crystallization occurred and the filtrate was then further concentrated until about ¼ of the original volume remained. To this solution an equal volume of water was added and a tar formed. The heterogeneous mixture was placed in a refrigerator for several weeks whereupon it was observed that the tar had become crystalline. This material was separated as reddish tarry crystals which were dissolved in ethanol, treated with charcoal, and filtered. Upon the addition of water, orange-yellow crystals of 2-aminobenzophenone were precipitated. Upon recrystallization from ethanol, light yellow crystals formed.

*Example 17*

A mixture of 50.0 g. of 2-amino-5-chloro-2'-fluorobenzophenone, 10 g. of charcoal, 30.0 g. of potassium acetate and 2.5 cc. of a 20 percent palladous chloride solution (20 percent by weight of palladium) in 300 cc. of tetrahydrofuran was hydrogenated at atmospheric pressure on a laboratory shaker. After an initiation period varying from ten minutes to an hour, hydrogen uptake was rapid and stopped completely at 0.2 moles plus the required amount to reduce the catalyst.

Filtration of the catalyst over a "Hyflo" pad and removal of the solvent left a yellow crystalline residue which was partitioned between methylene chloride (300 cc.) and water (1 l.). The layers were separated and the water layer washed with methylene chloride (3 x 50 cc.). The organic layers were combined, washed wiht 3 N sodium hydroxide solution (2 x 50 cc.), water (3 x 100 cc.), saturated brine solution (3 x 100 cc.), dried over anhydrous sodium sulfate and filtered. The solvent was removed and the product recrystallized from ethanol to give 42 g., 98 percent theoretical, of 2-amino-2'-fluorobenzophenone as yellow prisms melting at 126–128°.

We claim:
1. A process for the preparation of 2-aminobenzophenone which comprises hydrogenating 5-halo-2-aminobenzophenone with gaseous hydrogen in the presence of palladium catalyst and a halide ion acceptor selected from the group consisting of alkali metal hydroxide, alkaline earth metal hydroxide, alkali metal salt of a lower alkanoic acid, alkaline earth metal salt of a lower alkanoic acid and ammonium hydroxide.
2. A process for the preparation of 2'-halo-2-aminobenzophenone which comprises hydrogenating 5-halo-2'-halo-2-aminobenzophenone with gaseous hydrogen in the presence of palladium catalyst and a halide ion acceptor selected from the group consisting of alkali metal hydroxide, alkaline earth metal hydroxide, alkali metal salt of a lower alkanoic acid, alkaline earth metal salt of a lower alkanoic acid and ammonium hydroxide.
3. A process as in claim 1 wherein the palladium catalyst is formed in situ.
4. A process as in claim 1 wherein the hydrogenation is conducted at superatmospheric pressure.
5. A process as in claim 1 wherein the hydrogenation is conducted in the presence of an organic solvent said organic solvent being tetrahydrofuran.

References Cited by the Examiner

Busch et al.: Chemical Abstracts, 1930, volume 24, page 1104.

Mosby Chemistry and Industry, Oct. 24, 1959, No. 43, pp. 1348–9.

CHARLES B. PARKER, *Primary Examiner.*